(12) United States Patent
Gilbert

(10) Patent No.: US 7,731,356 B1
(45) Date of Patent: Jun. 8, 2010

(54) HANGING EYEGLASSES

(76) Inventor: Daniel Ayers Gilbert, 115 Justin Trail, Arden, NC (US) 28704

( * ) Notice: Subject to any disclaimer, the term of this patent is extended or adjusted under 35 U.S.C. 154(b) by 100 days.

(21) Appl. No.: 11/880,242

(22) Filed: Jul. 20, 2007

Related U.S. Application Data

(60) Provisional application No. 60/832,878, filed on Jul. 24, 2006.

(51) Int. Cl.
*G02C 3/00* (2006.01)

(52) U.S. Cl. ............... 351/157; 351/63; 351/121; 351/153; 16/228

(58) Field of Classification Search ............ 351/41, 351/63, 111, 119, 123, 153, 156, 157; 16/228
See application file for complete search history.

(56) References Cited

U.S. PATENT DOCUMENTS

| 264,574 | A | | 9/1882 | Shone |
| 2,829,558 | A | | 4/1958 | Ratti |
| 2,986,970 | A | | 6/1961 | Kilgour et al. |
| 3,361,514 | A | | 1/1968 | Davis |
| 3,476,466 | A | | 11/1969 | Hopkins |
| 3,701,591 | A | * | 10/1972 | Wichers ............ 351/41 |
| 3,846,018 | A | | 11/1974 | Gerson |
| 4,029,403 | A | * | 6/1977 | Harris ............ 351/121 |
| 4,681,410 | A | | 7/1987 | Paulsen |
| 4,986,650 | A | * | 1/1991 | Wilhelmi ............ 351/156 |
| 4,991,952 | A | | 2/1991 | Grau |
| 5,229,795 | A | | 7/1993 | Heintzelman |
| 5,638,147 | A | | 6/1997 | Wang-Lee |
| 5,745,952 | A | * | 5/1998 | Baragar et al. ............ 16/228 |
| 6,530,660 | B1 | | 3/2003 | Chao et al. |
| 6,679,604 | B1 | | 1/2004 | Bove et al. |
| 6,817,710 | B2 | | 11/2004 | Benavides et al. |
| 2005/0270481 | A1 | | 12/2005 | Curci et al. |
| 2006/0092373 | A1 | | 5/2006 | Gao |

* cited by examiner

*Primary Examiner*—Huy K Mai
(74) *Attorney, Agent, or Firm*—Robert W. Pitts

(57) ABSTRACT

Eyeglasses that can be hung around the wearer's neck, without the necessity of a chain or cord, can be rotated between a normal viewing position, a conventional storage position and a hanging position. In the hanging positions, the rear ends of temple arms are spaced apart by a distance less than the diameter of a normal wearer's neck. In embodiment in which a hinge between the lens frame and the temple arms can be pivoted about three orthogonal axes, the lens frame will lie flat against the wearer's chest or neck. Two hinge configurations that allow the lens frame to lie flat include a ball and socket joint and a multiple hinge joint. The temple arms can also be extended so that the eyeglasses will more comfortably fit around the wearer's neck in the hanging position.

20 Claims, 10 Drawing Sheets

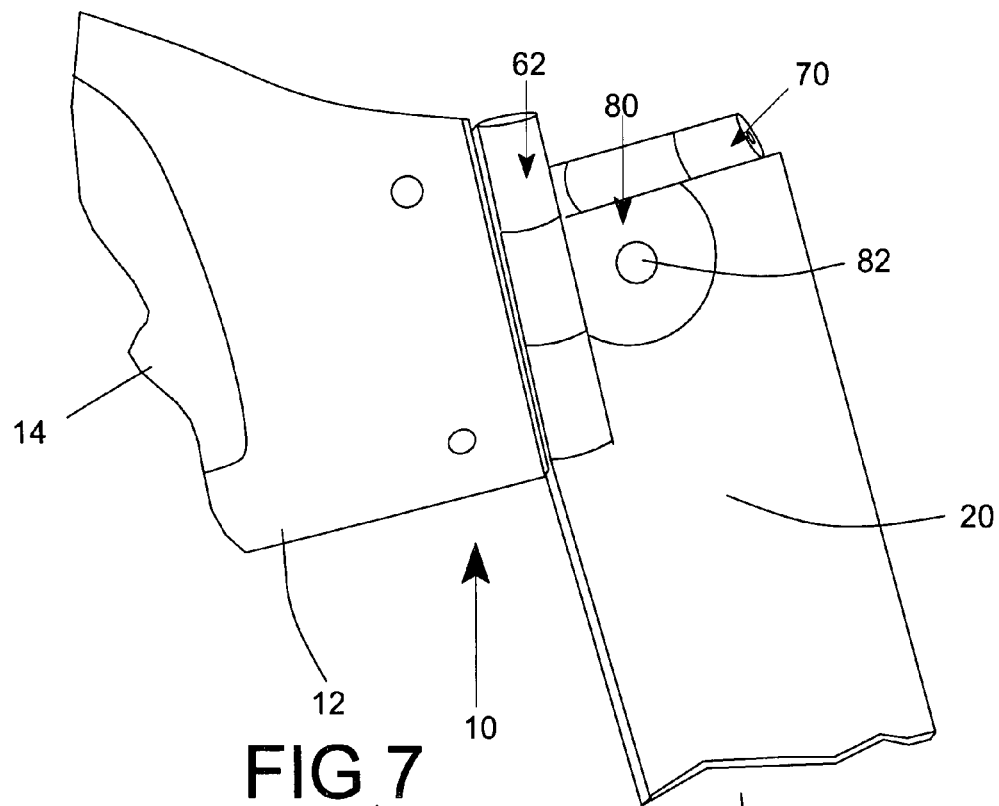
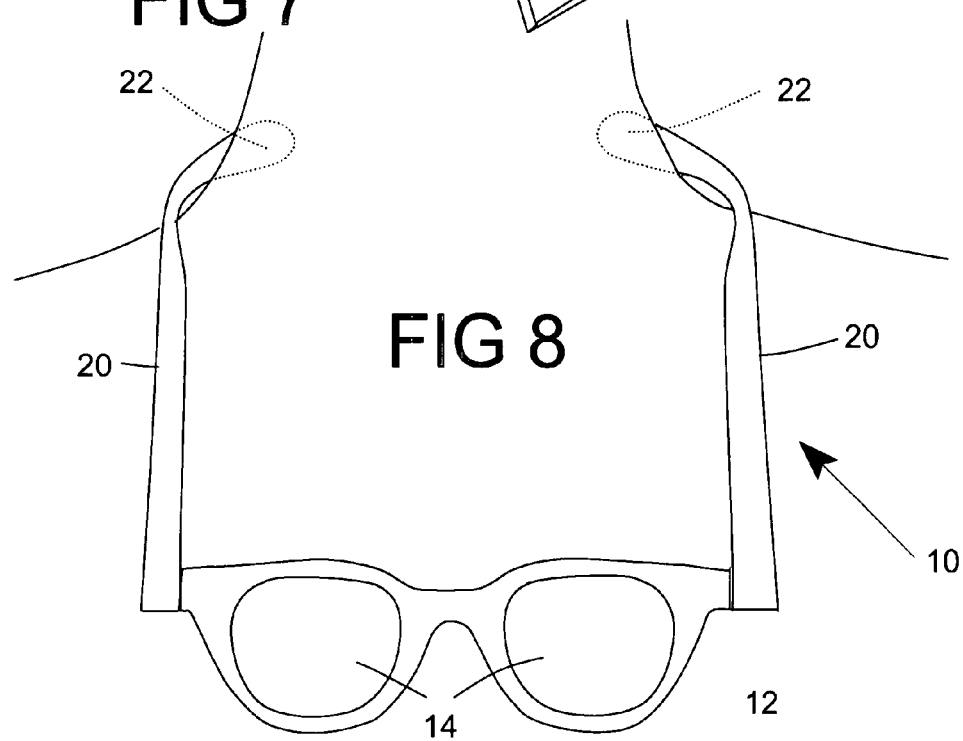

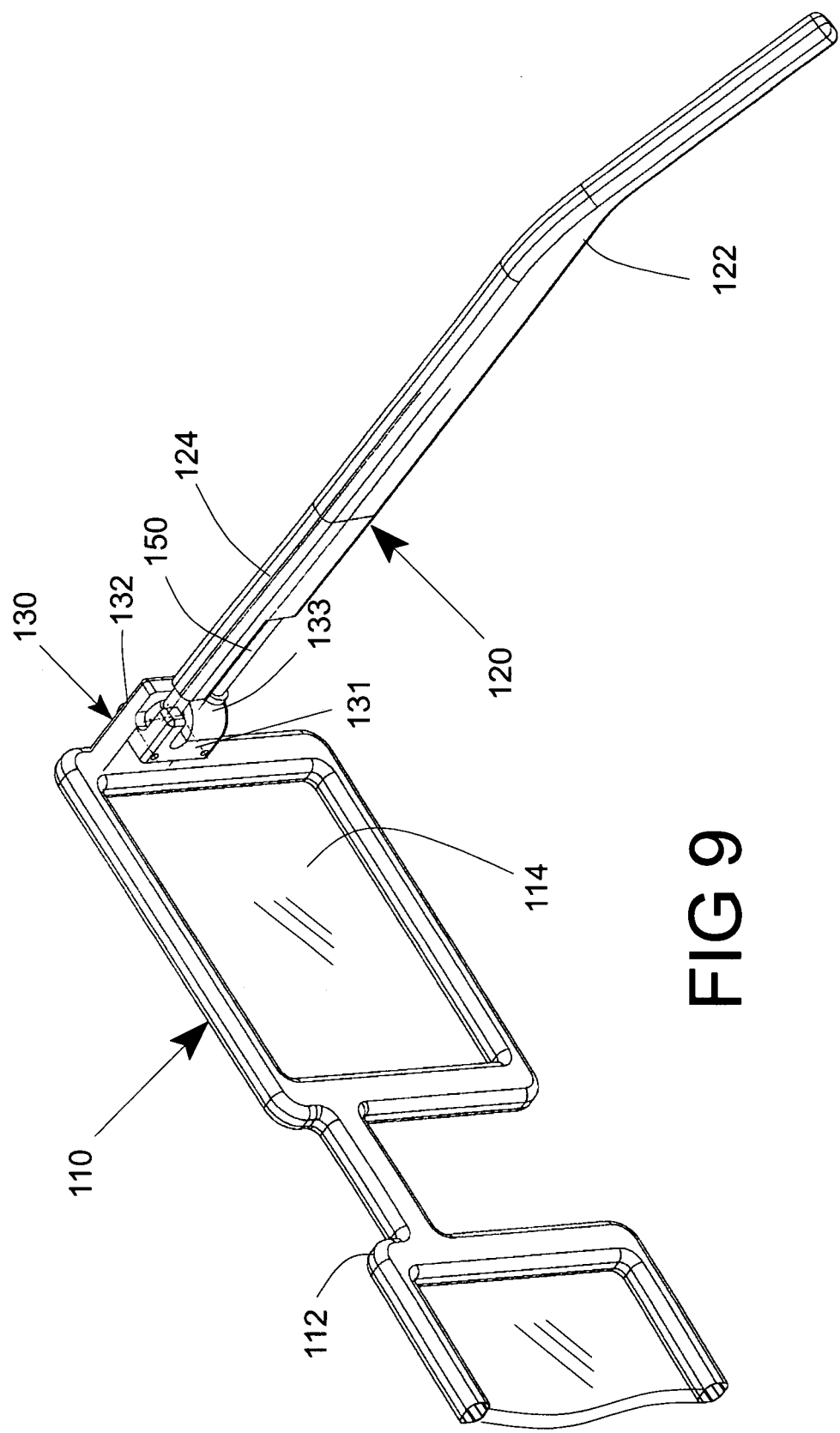

HANGING EYEGLASSES

CROSS REFERENCE TO PRIOR CO-PENDING APPLICATION

This application claims the benefit of U.S. Provisional Patent Application 60/832,878 filed Jul. 24, 2006 entitled Hanging Eyeglasses.

BACKGROUND OF THE INVENTION

1. Field of the Invention

As an alternative to using conventional straps to retain eyeglasses around the wearer's neck, the instant invention allows the temple piece or arm to rotate about its longitudinal axis so that the curved ends will rotate toward each other to reduce their spacing. When rotated in this manner the ear pieces can extend behind the wearer's neck to retain the glasses when not in use. This approach would be suitable for a user who cannot use his reading glasses for normal vision, or cannot use his normal glasses or even his bifocals for reading. It could also be used with sunglasses.

2. Description of the Prior Art

U.S. Pat. No. 5,229,795 does disclose an eyeglass frame in which the temple pieces can be folded into a flat configuration so that the glasses can hang flat against a wearer's neck. However, the temple pieces can only be folded in a direction opposite from the orientation that would permit the earpieces to engage the wearer's neck to retain the glasses when not in use. These glasses require the use of a strap to retain them around the wearer's neck.

U.S. Pat. No. 4,029,403 discloses eyeglasses in which the temple and nose pieces are free to rotate so as to fit the profile of the wearer. These eyeglasses employ a ball and socket connection. It would appear that the ball and socket joint would permit rotation of the temple or earpiece about the longitudinal axis of the temple piece. There is, however, no description of this possibility, nor is there anything to suggest that this ball and socket configuration could be employed to position the temple pieces so that they would grip the wearer's neck. There is no detent on anything to hold the temple pieces in position, so even if the ear pieces could be folded into the proper orientation, there would be nothing to prevent them from returning to their original position, allowing the glasses to slip from the wearer's neck. The split ball configuration shown in this patent might also be too expensive to manufacture for this type application. The shape of the rear earpieces does not appear suited for gripping the rear of the wearer's neck.

U.S. Pat. No. 3,476,466 discloses eyeglasses having a ball and socket hinge. This ball and socket can pivot about a vertical axis and a horizontal axis perpendicular to the temple or ear pieces so that the temple pieces can be folded over the front or rear of the lens. However, the ball and socket joint does not permit the temple pieces to be folded about a horizontal axis through the temple pieces because there will be no clearance for the ball stem. Therefore, the temple pieces cannot be folded so that the ear pieces can grip the wearer's neck for retaining the eyeglasses.

U.S. Pat. No. 5,745,952 discloses eyeglasses with a constrained ball and socket joint. A collar is positioned to resist torsional rotation along the longitudinal axis of the earpiece. Therefore the earpiece cannot be rotated to grip the back of the wearer's neck U.S. Pat. No. 3,278,981 discloses a ball and socket hinge, but this hinge appears to be intended for use on a door or door jam. The ball has a threaded member secured to the ball, and apparently the threaded member is screwed into a door or similar article. There is no apparent suggestion that the threaded member should be attached to a temple or earpiece employed in an eyeglass frame.

US Patent Application Publication 2005/0270480 discloses another ball and socket hinge, but this hinge cannot be rotated as required for the invention under consideration.

U.S. Pat. No. 6,062,690 is an example of a retainer or strap that can be mounted on a pair of glasses.

SUMMARY OF THE INVENTION

According to one aspect of this invention, a pair of eyeglasses includes a front lens frame and a pair of temple arms hinged relative to the front lens frame so that the temple arms can be folded into a storage position with the temple arms folded behind the front lens frame. This pair of eyeglasses will include temple arms with rear sections that face inwardly when the pair of eyeglasses are positioned in a hanging position so that the rear sections will extend partially behind the wearer's neck in the hanging position to hold the eyeglasses on the wearer's neck.

According to another aspect of this invention the pair of eyeglasses are characterized in that the temple arms can be folded relative to the front lens frame into a hanging position in which the temple arms extend transversely relative to a position occupied by the temple arms in the storage position. In this hanging position, the ear gripping sections of the temple arms extend inwardly toward each other when in the hanging position so that the ear gripping sections can extend behind a wearer's neck to hold the pair of eyeglasses around the wearer's neck. A ball and socket joint can be employed between the lens frame and the temple arms. A multiple hinge configuration can also be employed. By hinging the temple arms relative to the lens frame in this manner, the lens frame can lie flat against the wearer's upper chest or neck in the hanging position. These two hinge configurations are merely representative of other equivalent versions.

BRIEF DESCRIPTION OF THE DRAWINGS

FIG. 5 shows on temple arm in the normal position in which the eyeglasses would be worn.

FIG. 7 is cutaway view showing the temple arm rotated ninety degrees relative to the position shown in FIG. 6. Rotation about an axis generally parallel to the lens frame brings the temple arm into the hanging position in which the temple arms can be hung around the wearer's neck.

FIG. 8 is a view showing the hanging position of the eyeglasses of the configuration of FIGS. 5-7, so that the eyeglasses can be hung around the wearer's neck when not in use. The front lens frame can be generally flat relative to the wearer's chest, just below the wearer's neck.

FIG. 9 is a partial view of another embodiment of eyeglasses having a ball and socket connection between the eyeglass frame and the temple arms.

DETAILED DESCRIPTION OF THE PREFERRED EMBODIMENTS

Figure 1:
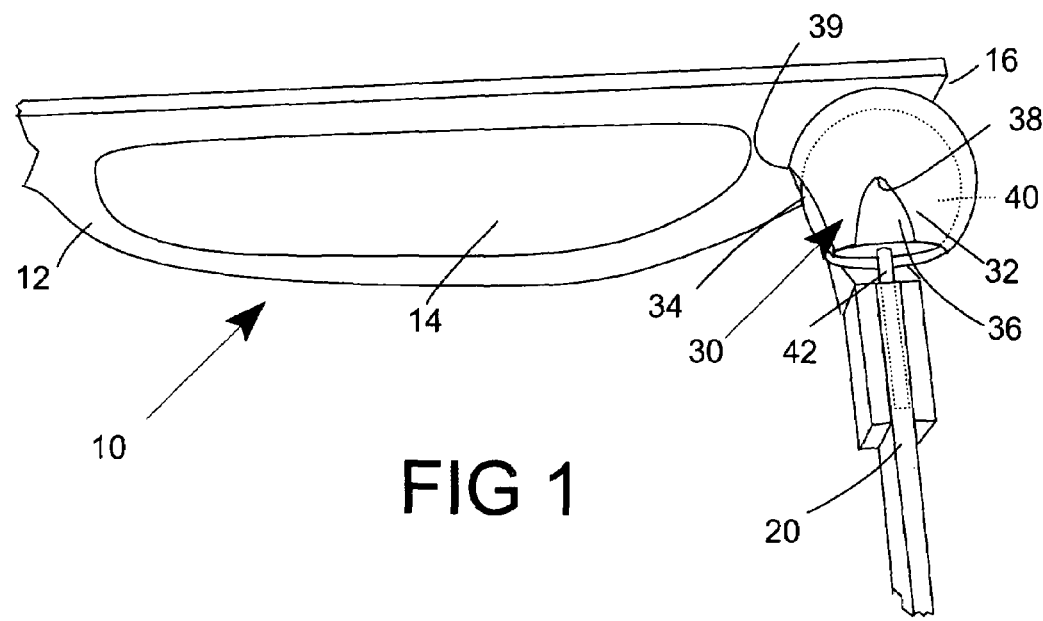
FIG. 1 is a partial cutaway view showing one end section of a pair of eyeglasses in which a ball and socket hinge connects one temple arm to the front frame of the eyeglasses. The position shown in FIG. 1 is that in which the eyeglasses would normally be worn.

Representative embodiments of eyeglasses that can be hung around a wearer's neck when not in use are depicted herein. These representative embodiments are not intended to be exhaustive, but are merely intended to show configurations in which rear sections or ear gripping sections of the temple arms on a pair or eyeglasses can be positioned in a manner such that opposed rear sections will be spaced apart by a distance less than the diameter or width of the wearer's neck. The eyeglasses can then be placed hanging position around the wearer's neck, when not in use, and it will not be necessary to attach a hanging chain or cord to the ends of these eyeglasses. The eyeglasses according to these representative embodiments will be suited for use in sunglasses or in prescription eyeglasses, that may not be suited for both short range and long range viewing. It should be understood that the representative embodiments are described in terms of a wearer of normal size and that size of the eyeglasses can be modified to fit larger wearers or to fit small children, and the same operative principles will apply.

Separate embodiments shown respectively in FIGS. 1-4 and in FIGS. 5-8 employ hinges that can be rotated about three orthogonal axes. These eyeglasses can be shifted between a normal viewing position, a conventional storage position and a hanging position in which the lens frame will lie flat against the wearer's chest or lower neck.

The first embodiment of eyeglasses 10, shown in FIGS. 1-4 includes a ball and socket joint 30 between the front frame 12 containing lens 14 and each temple arm 20. It should be understood that for illustrative purposes the ball and socket joint 30 is not necessarily shown to scale relative to the remaining portions of the eyeglasses 10. Furthermore the individual components of the ball and socket joint 30 are also not necessarily to scale relative to each other. The drawings are drawn in a manner so that relatively small parts can be visualized and their structure and operation will be more readily apparent. The same caveat also applies to the scale of the components of the other representative embodiments depicted herein.

FIG. 1 shows one side of a pair of eyeglasses 10 in which one temple arm 20 is shown in its normal operative position when the eyeglasses are used for viewing. The temple arm 20 extends rearwardly in a direction transverse to the lens frame 12 and to the lens 14. Normally the temple arm 20 will extend generally perpendicular to the plane of the lens 14 and the lens frame 12. Sockets 32 are mounted to the lens frame 14 at each end 16. A ball 40, received in a corresponding socket 32, is mounted on the end of a temple arm 20 by a ball stem 42. It should be understood that the generally spherical socket 32 can be fabricated in two or more pieces both for insertion of the corresponding ball 32 and for manufacturing efficiency. The balls 40 can rotate relative to the corresponding socket about an axis extending through the ball stem 42. The balls 40 can also be rotated about two axes extending orthogonally relative to the axis of the ball stem 42. Such rotation is facilitated by notches 34 and 36 formed in the sockets 32, which will provide clearance for the ball stem 42 when the temple arms 20 are rotated into a storage position and into a hanging position.

The notch 34, facing inwardly as shown in FIG. 1 comprises a storage notch, which will permit inward rotation of the entire temple arm into a normal storage position in which the temple arms extend behind the lenses 14 and the lens frame 12. This is the normal folded configuration in which a pair of eyeglasses can be inserted into a storage case. The apex of storage notch 34 can include a storage detent 39, which can grip the ball stem 42, when in the storage position to retain the temple arms 20 in place. The storage detent can include circular edges that will expand slightly to receive the cylindrical ball stem 42. Only a slight force would be necessary to remove the ball stem 42 from storage notch 39.

Figure 3:
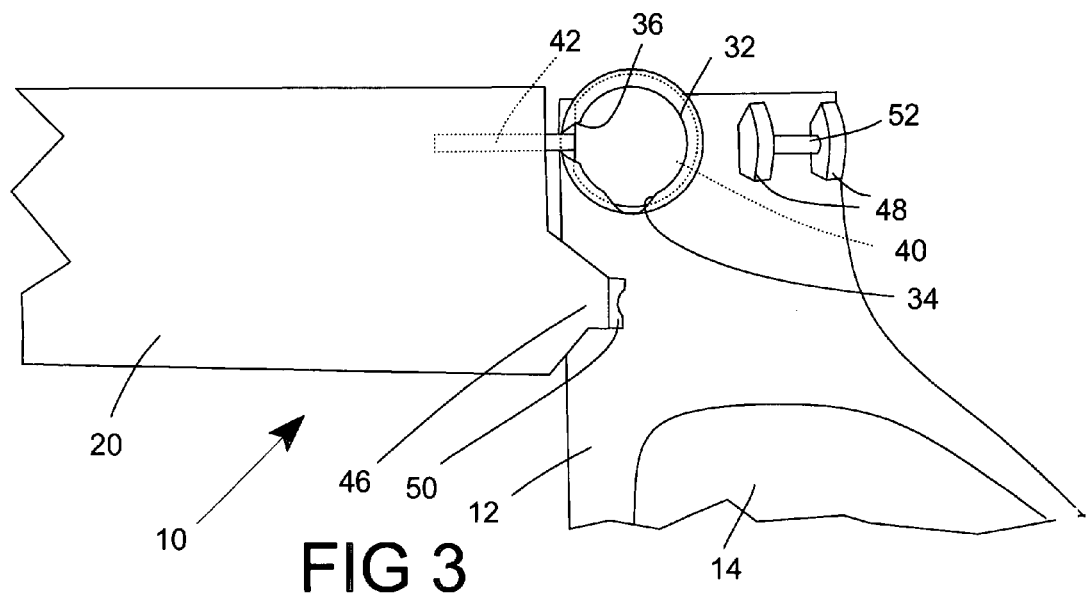
FIG. 3 is a partial cutaway view of the ball and socket hinge configuration of FIGS. 1 and 2, showing one temple arm rotated ninety degrees relative to the plane of the frame so that the temple arm now extends generally perpendicular to the front frame so that the temple arms are in a hanging position to retain the eyeglasses around the wearer's neck.

As shown in FIG. 1, the second notch 36 is located on the spherical socket 32 at approximately a ninety degree position relative to the storage notch 34. The second notch 36 comprises a hanging notch, which will receive the ball stem 42 when the temple arms 20 are in the hanging position. This hanging position is shown in FIG. 3 in which the temple arm 20 will extend generally at right angles relative to the lens frame 12 and generally at right angles to the position which the temple arms 20 would occupy in the storage position. The hanging notch 36 includes a hanging detent 38 at its apex. This hanging detent 38 also receives and grips the ball stem 42 to hold the temple arms in the hanging position. Hanging detent 38 will operate in the same manner described relative to storage detent 39. In some cases the storage detent 39 can be eliminated.

The ball and socket joint 30 is located at the top of the lens frame 14 and the top edge of the temple arms 20. A support is positioned below the ball and socket joint 30. This support comprises a first support member 46 located below the socket 32 on the lens frames 12 and a second support member 48 located below the ball 40 on the temple arm 20. The first function of this support is to hold the temple arms in position when the eyeglasses are worn. The second function is to form a stop when the eyeglasses are in the hanging position as shown in FIG. 3.

The first support member 46 comprises a tapered protrusion extending from the front edge of the temple arm 20. As shown in FIG. 3, this first support member is immediately below the ball stem 42. The front of this support member 46 includes a retention member, which in this representative embodiment comprises a magnet 50. As shown in FIG. 3, the front edge of the magnet 50 is located immediately below the pivot point of the ball and socket joint.

The second support member 48 is mounted on the lens frame 12 immediately below the socket 32. Second support member 48 comprises a pair of spaced projections extending upwardly from the plane of the lens frame 12. A magnetically attractive rod 52 extends between these projections and the rod is positioned so that the magnet 50 will engage this rod 52, when the temple arms 20 are in the normal viewing position shown in FIG. 1. The supports 46 and 48 are obstructed by the ball and socket joint 30 in FIG. 1, and are therefore not seen in that view. Other retention mechanisms may be substituted for the magnetic configuration depicted herein. For example, a simple plastic snap arrangement could be substituted.

The manner of rotating the temple arms 20 to the storage position is relatively straight forward and is therefore not shown. As previously described the temple arms 20 are merely rotated inwardly with the storage notch 34 receiving the ball stem 42. The magnet 52 is dislodged from the rod 52 upon inward rotation of the temple arms 20.

Figure 2:
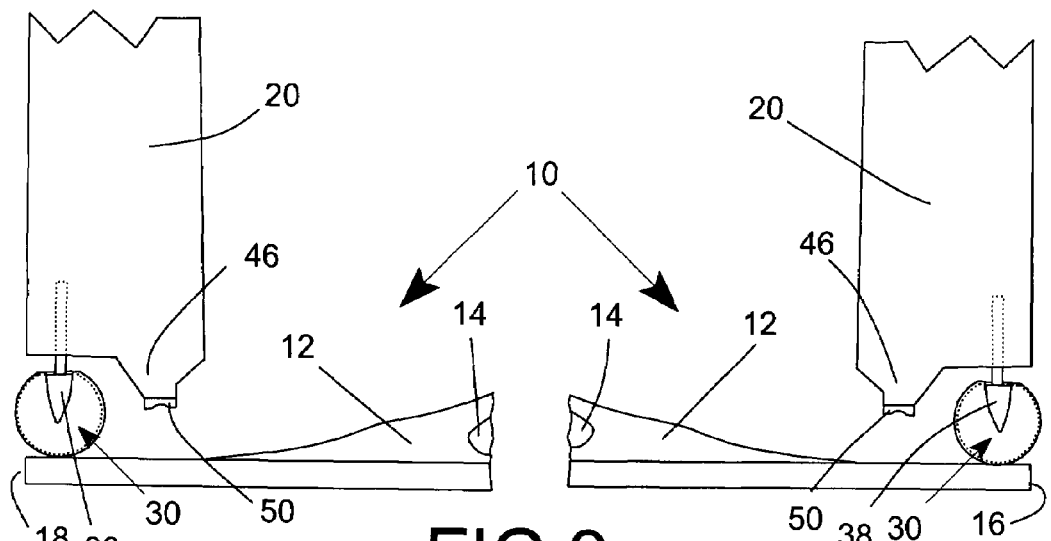
FIG. 2 is a cutaway view showing the temple arms on both sides of the front frame after they have been rotated ninety degrees with respect to an axis extending rearwardly relative to the frame to an intermediate position.

Movement of the temple arms 20 from the viewing position shown in FIG. 1 to the hanging position shown in FIG. 3 requires an intermediate step shown in FIG. 2. This first step requires the temple arms to be rotated about the axis through which the ball stem 42 extends. Notice that the ball stem 42 engages neither notch 34 or 36 in the viewing position of FIG. 1. In the viewing position of FIG. 1, the magnet 50 engages the rod 52, but this simple attractive connection can be broken by rotation of the temple arms 20 about the axis of the ball stem 42, which corresponds generally to the direction in which the temple arms extend. Notice that rotation from the viewing position to the intermediate position shown in FIG. 2 exposes the first support 46, which does not then engage the lens frame 12.

Subsequent rotation of the temple arm 20 will move the temple arms into the hanging position of FIG. 3. Rotation of the ball and socket joint from the position of FIG. 2 is only possible in the direction in which the ball stem 42 will be received in the hanging notch 38. The support 46 will abut the lens frame 12 if an attempt is made to rotate the temple arm 20 in the direction in which the ball stem 42 would be received by the storage notch. Thus the only possible movements of the temple arms 20 from the position shown in FIG. 2 is either into the hanging position of FIG. 3 or a return to the viewing position of FIG. 1. When the temple arms 20 are rotated into the hanging position of FIG. 3, the support member 56 will abut the lens frame 12. The ball stem 42 will also be engaged by the detent 36, and the temple arms 20 will be held in the hanging position in which the temple arms extend upwardly from the lens frame. The lens frame 12 and the temple arms 20 will be flat relative to each other.

Figure 4:
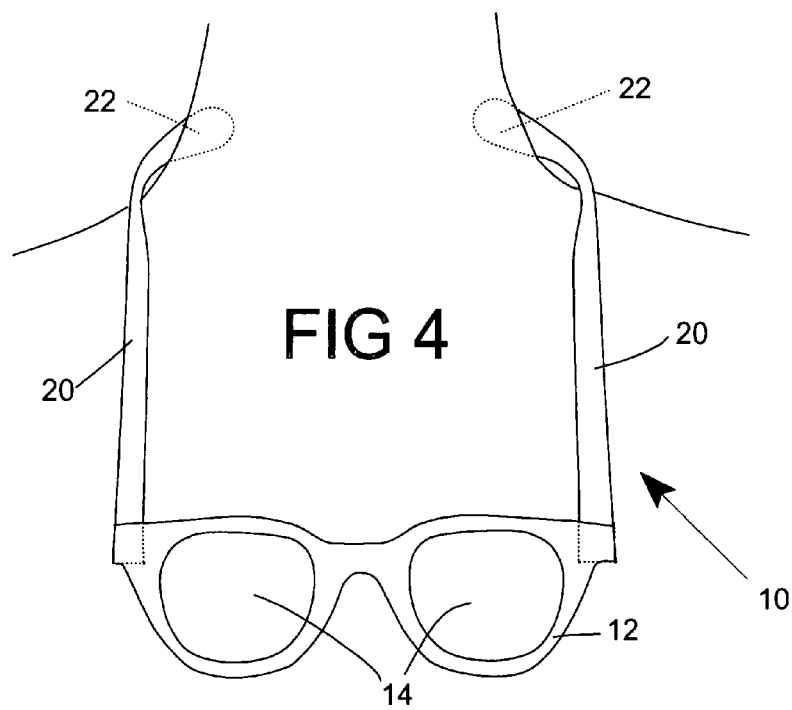
FIG. 4 is a view of the eyeglasses in hanging configuration in which the temple arms extend behind the wearer's neck and the frames can be substantially flat on the wearer's chest just beneath the wearer's neck.
Figure 5:
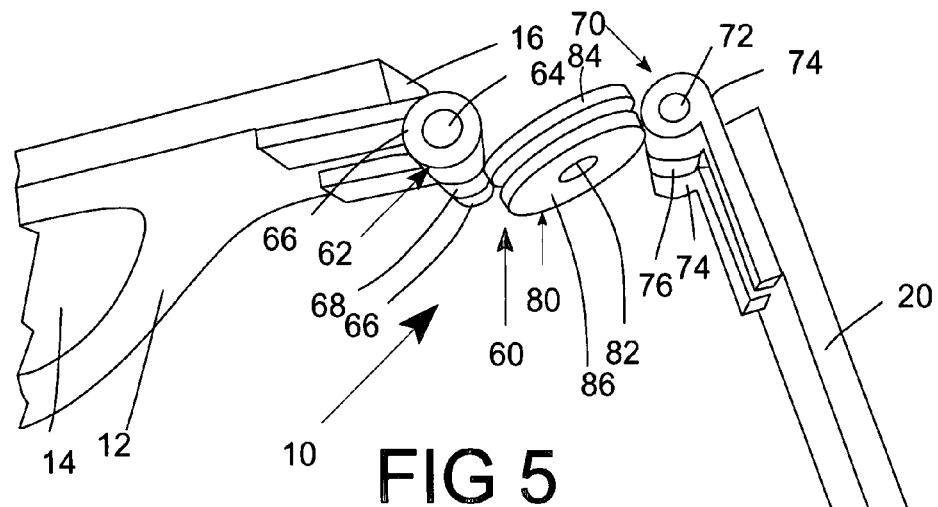
FIG. 5 is a partial cutaway view of an alternate embodiment of eyeglasses in which the temple arms are joined to the front frame by a series of interconnected hinges.

In the hanging position, the ear gripping sections 22 will extend inwardly toward each other so that the ear gripping sections can be positioned partially behind the wearer's neck as shown in FIG. 4. The lens frame will also lie flat along the wearer's chest or the lower part of his or her neck. FIG. 4 is merely intended to show the relative positions of the lens frame 12, the temple arms 20 and the ear gripping sections when the eyeglasses 10 of the embodiment of FIGS. 1-3 are in the hanging position. No attempt has been made to show the details of the ball and socket joint 30 in FIG. 4.

The second embodiment of FIGS. 5-8 employs a different hinge mechanism for shifting the pair of eyeglasses 10 between a viewing, a storage and a hanging position. This configuration employs a multiple hinge joint 60 including a first hinge 62, a second hinge 70 and a third hinge 80. The first hinge 62 is mounted on the eyeglass frame 12. The second hinge 70 is mounted on the temple arms 20, and the third hinge, comprising a frame hinge disc 84 and an arm hinge disc 86 is mounted between the hinges 62 and 70. As with the first embodiment, this hinge joint is not necessarily to scale and is intended to be representative of a joint that can be employed in conjunction with this invention.

The first or frame hinge 62 includes outer rings 66 joined to the eyeglass frame 12. A third, inner ring 68 is positioned between the two outer rings 66, and ring 68 is attached to frame hinge disc 84 in the third hinge 80. A hinge pin 64 joins the three rings 66 and 68, and the assembly comprising one temple arm 20, the second or temple arm hinge and the intermediate third hinge 80 can be rotated about the frame hinge 62 to rotate the temple arms 20 from a normal viewing position shown in FIG. 5 to a conventional storage position, not shown. Rotation into the storage position is not significantly different from rotation of a conventional pair of eyeglasses for storage.

The temple arm hinge 70 also includes a pair of outer rings 74 and an inner ring 76 with a hinge 72 joining the three rings. The outer rings 74 are fixedly attached to the inside of temple arm 20. The inner ring 76 is affixed to the arm hinge disc 86 forming part of the intermediate disc hinge assembly 80.

The two discs 84 and 86 forming the disc hinge assembly 80 are joined by a hinge pin 82 and are rotatable relative to each other. Detent means, not shown, in the form of iteracting surfaces on the discs 84 and 86 can be employed to limit mutual rotation and to and stabilize the temple arms 20 in the viewing, storage and hanging positions.

Figure 6:
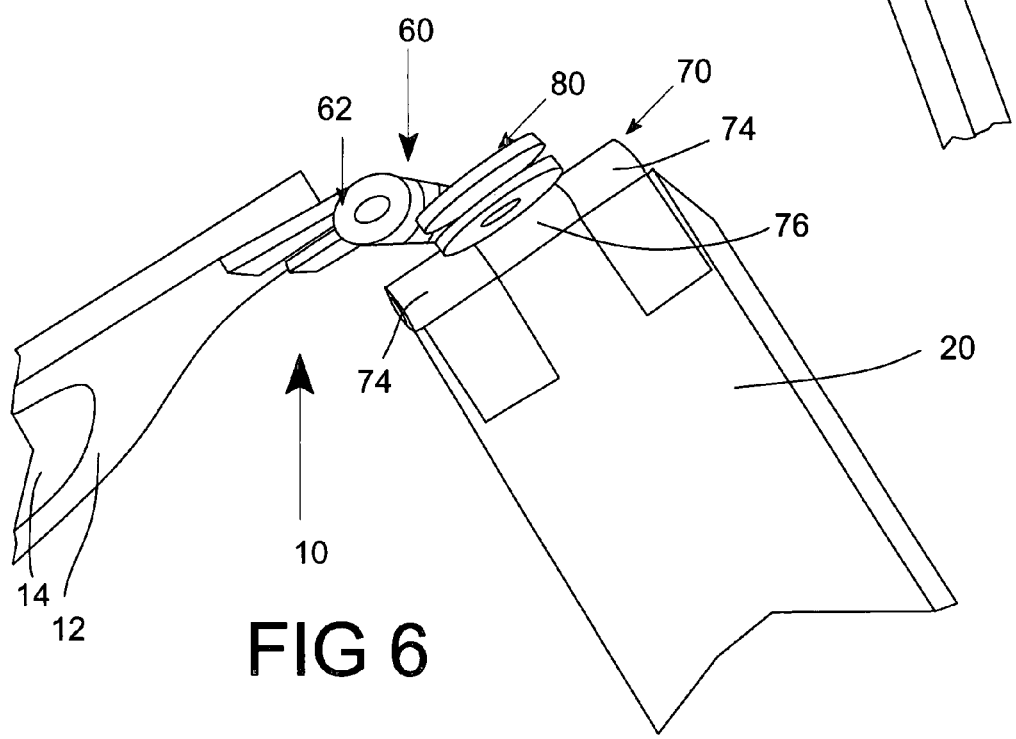
FIG. 6 is a cutaway view of one of the eyeglasses hinges in which the temple arm has been rotated ninety degrees relative to an axis extending substantially perpendicular to the eyeglass lens frame. This is an intermediate position.

FIG. 8 shows the relative position of one temple arm 20 relative to the lens frame 12, when the eyeglasses 10 of this embodiment are in the hanging position. FIG. 6 shows the intermediate position between the viewing position of FIG. 5 and the hanging position of FIG. 7. To shift the temple arms 20 to the hanging position, the temple arm and the temple arm hinge 70 are rotated as a rigid body to the position shown in FIG. 6. Temple arm disc 86 rotates about an angle of approximately ninety degrees relative to frame hinge disc 84 to shift the eyeglasses from the position of FIG. 5 to the position of FIG. 6. To rotate the temple arms 20 from the intermediate position of FIG. 6 to the hanging position of FIG. 7, the temple arms 20 are rotated about temple arm hinge 70 through an angle of approximately 90 degrees relative to the disc hinge 80 and to the lens frame 12. The arms 20 will then extend upwardly from the lens frame 12 in the position represented by FIG. 8 and the eyeglasses can be suspended around the wearer's neck in the same way as previously discussed relative to the embodiment of FIGS. 1-4. Note that FIG. 7 shows the eyeglasses upside down.

An additional feature that can be added to this and other embodiments would be a tab (not shown) that could be mounted on the temple arms. This tab could be used to grip the temple arms and assist the wearer in twisting the temple arms to the hanging position. The tab could also function as a visual indicator of the position of the temple arms.

Both of these embodiments employ hinge configurations between the lens frame and the temple arms to orient the eyeglasses in the hanging position. One of the advantages of these configurations is that the lens frame will then be in a position to lie flat against the wearer's upper chest or lower neck.

FIGS. 9-12 show another embodiment of hanging eyeglasses 110 in which the temple arms 120 can be attached at opposite ends of front eyeglass frame 112 by a ball and socket joint 130 that can perhaps be more readily manufactured than the embodiment of FIGS. 1-4. FIGS. 9-12 show only one side of eyeglasses 110 and one temple arm 120, but another temple arm 120 of the same configuration would be attached to the opposite end of the eyeglass frame 112. One of the lens 114 is broken away so that temple arm 120 and the balls and socket joint 130 can larger and therefore be shown with more clarity in FIGS. 9-12. As will be subsequently explained in more detail, eyeglasses 110 also employ telescoping temple arms 120 so that temple arms 120 can be extended so that they can be adjusted for to be more comfortable in the hanging position.

Figure 10:
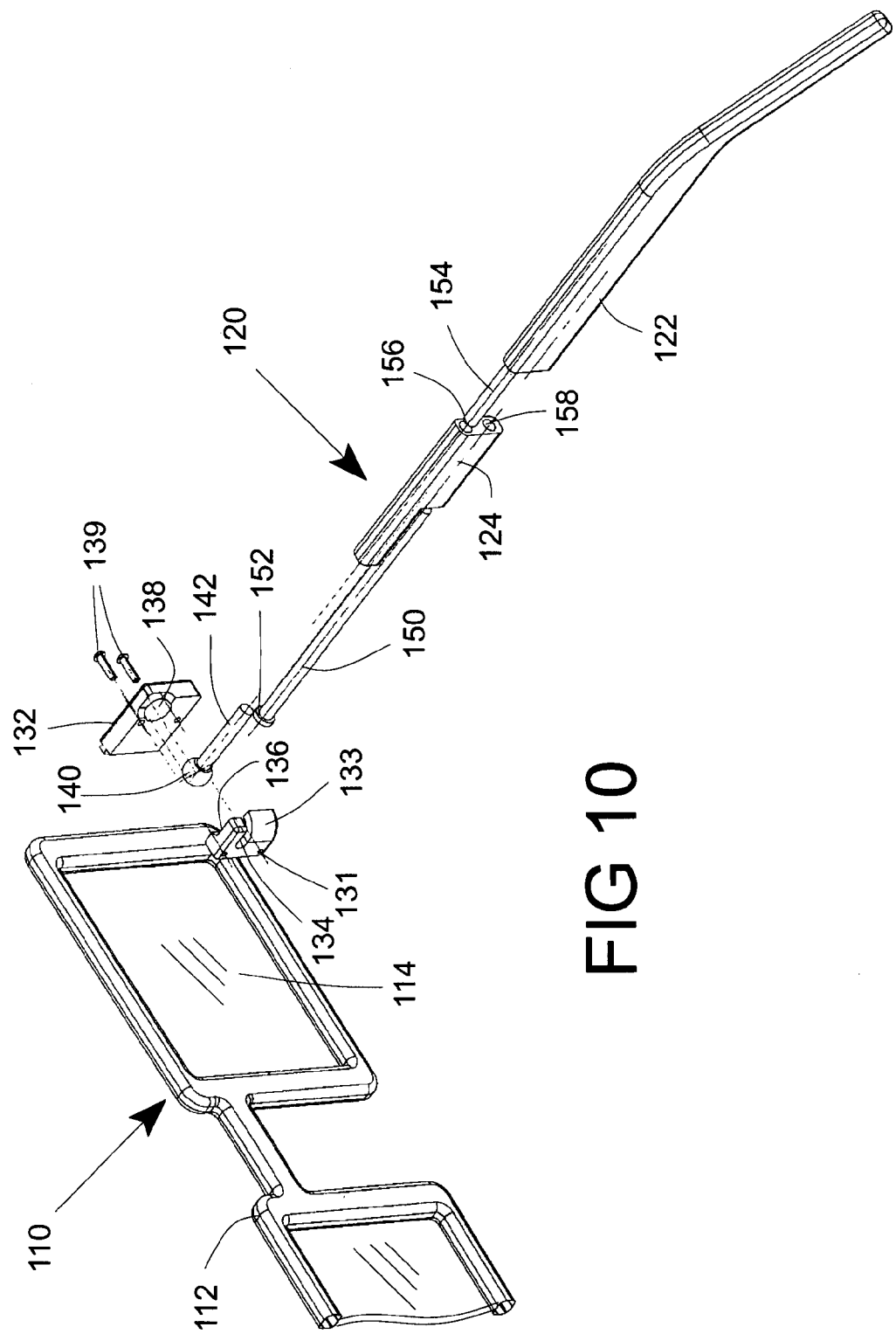
FIG. 10 is an exploded view of the embodiment of FIG. 9 showing the manner in which a ball and socket joint connects one temple arm to the eyeglass frame.
Figure 11:
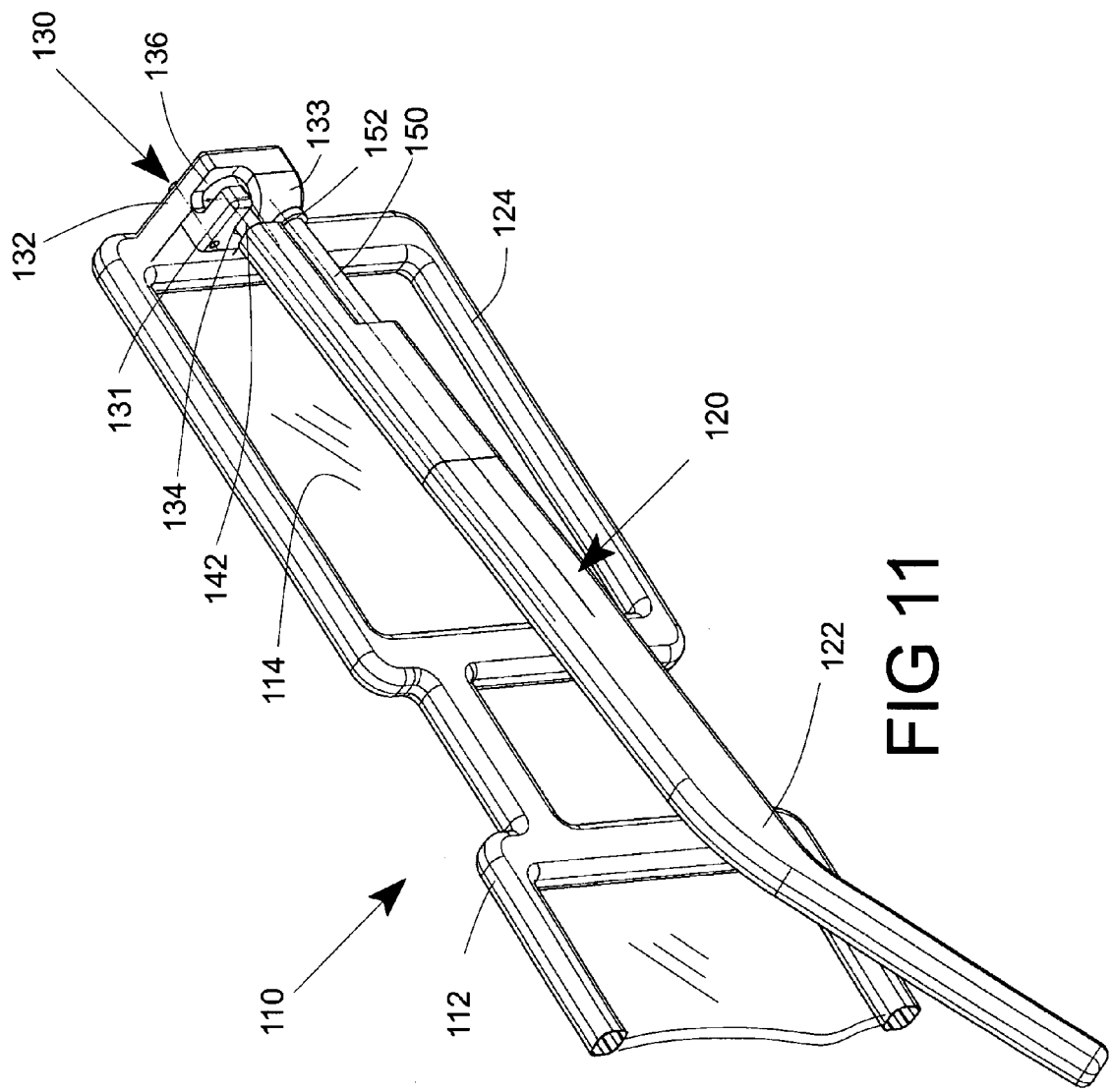
FIG. 11 is a view of the embodiment of FIGS. 9 and 10 showing one temple arm in the storing position.
Figure 12:
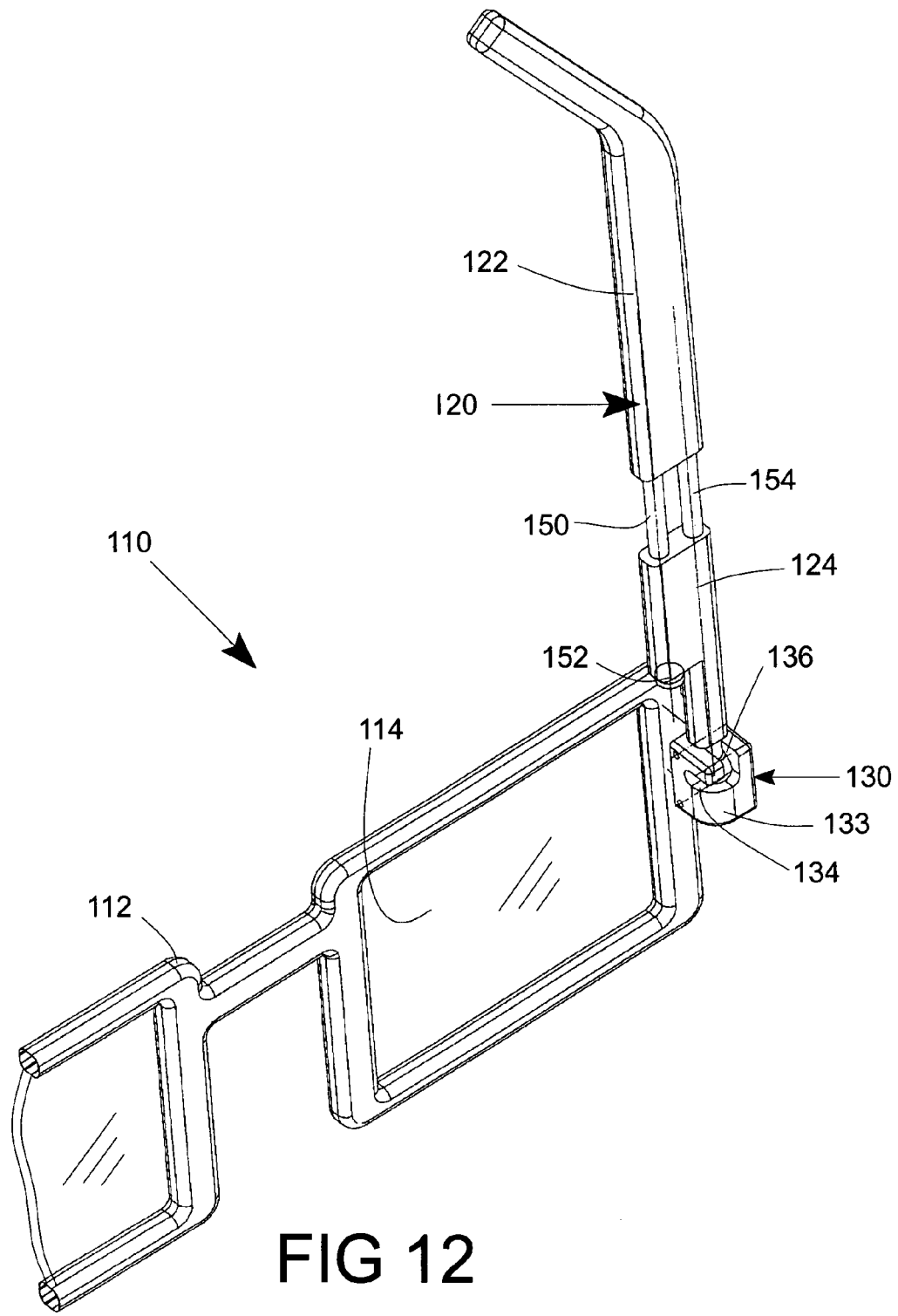
FIG. 12 is a view of the embodiment of FIGS. 9 and 10 showing one temple arm in the hanging position.

The temple arms 120 of the embodiment of FIGS. 9-12 are formed by a front piece 124 that will abut a rear or curved ear piece 122 in the normal position shown in FIG. 9. In this position the ear piece 122 on each side of the eyeglasses will fit comfortably behind the wearer's ears. The ball and socket joint 130 is mounted on the upper edge of the eyeglass frame 112 along the end. The temple arm 120 will rotate inwardly about the ball and socket joint to the storage position shown in FIG. 11, so that the eyeglasses 110 can be stored in a typical eyeglass case in a conventional fashion. The ball and socket joint 130 will also allow the temple arm 120 to rotate upwardly to the hanging position shown in FIG. 12. Although only one temple arm 120 is shown in FIGS. 9, 11 and 12, it should be understood that the temple arms 120 on both ends of eyeglass frame 112 will rotate between these three positions in the same manner, and that the ball and socket joints 130 on each end will be identical. In other embodiments, where fashion may be an issue, the ball and socket joints at opposite ends can be mirror images of each other.

FIG. 10 is an exploded view showing the various components of the ball and socket joint 130 and the temple arm 120 in more detail. The ball and socket joint 130 includes a socket formed by two mating socket components 131 and 132. The socket components 131 and 132 can be attached to the frame 114 in a number of conventional ways. One socket component, such as socket component 132 can even be fabricated as part of the frame 114 if desired for fashion or economical purposes. Normally however, the two socket components 131 and 112 will be assembled together before mounting them to the frame 114.

Figure 13:
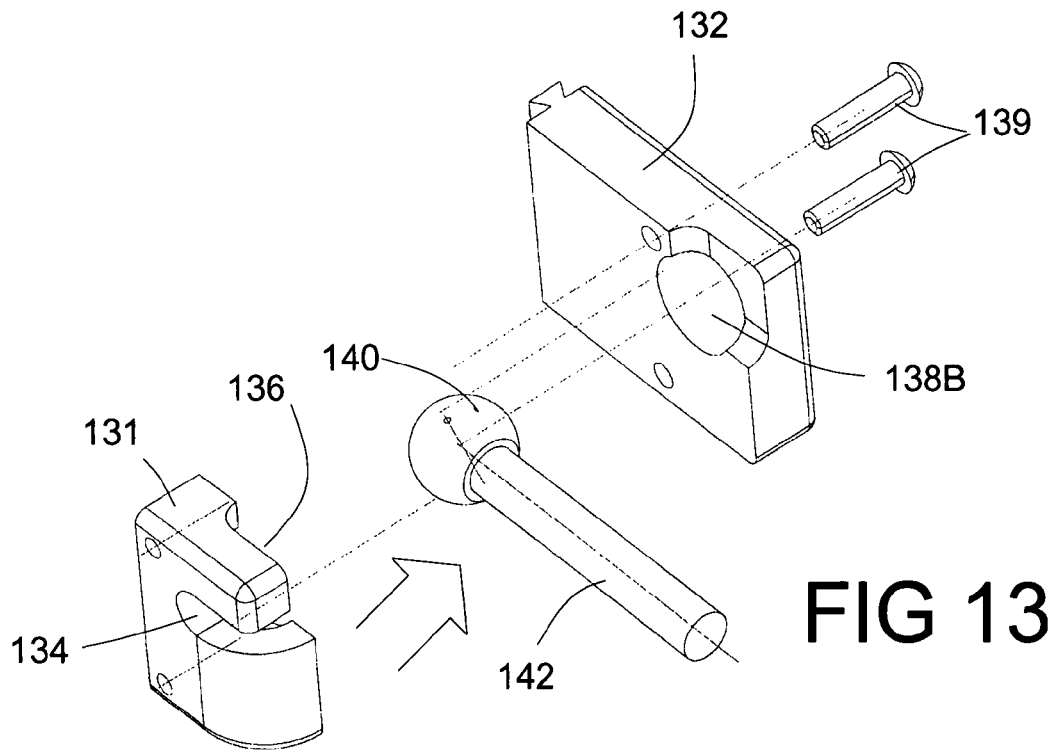
FIG. 13 is an enlarged view showing the components for forming the ball and socket joint and illustrating one semi-spherical surface that will form part of the spherical socket.
Figure 14:
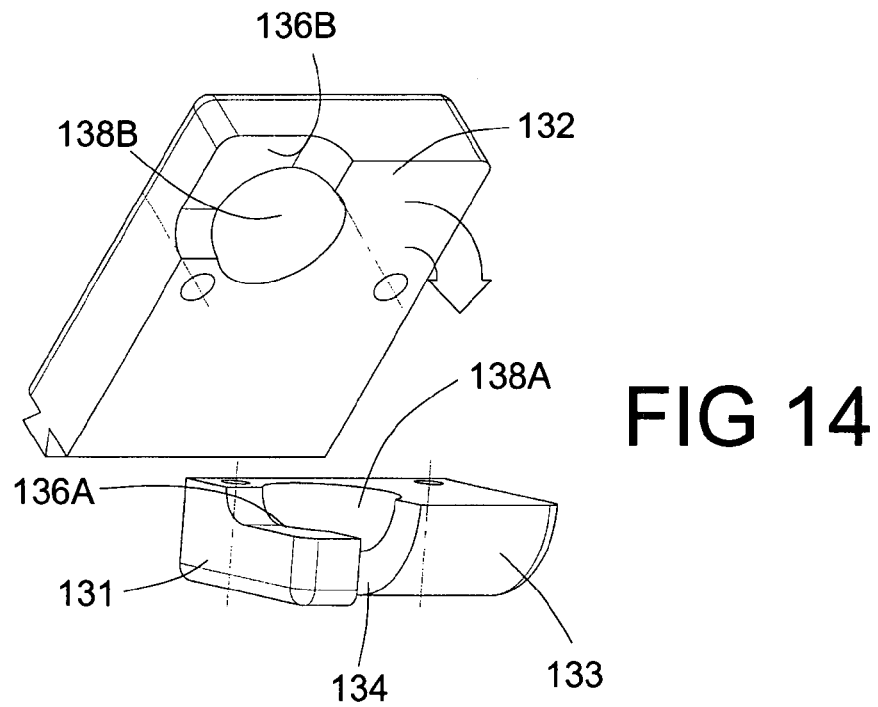
FIG. 14 is an enlarged view of one socket component showing the other semi-spherical surface that will form part of the spherical socket.

These socket components includes a spherical pocket 138 formed by interior curved sections on facing surfaces of each socket component 131 and 132. One semi-spherical surface is shown on the interior of socket component 132 in FIG. 10. A similar semi-spherical pocket is formed on the interior of socket component 131. FIGS. 13 and 14 show the two semi-spherical surfaces 138A and 138B that will fit together to form the spherical socket 138. These two semi-spherical surfaces will form the spherical socket 138 when socket components 131 and 132 are attached by screws or fasteners 139. Preferably both socket components 131 and 132 would be fabricated from metal stock and these socket components can be machined. Alternatively, these socket components can be cast or injection molded if a plastic material is substituted for the metal.

The spherical ball 140, attached to the temple arm 120, will fit within the socket 138. A stem 142 extends from the ball 140, and the ball stem or shaft 142 will fit within a companion opening on the front face of front arm section 124. The arm stem 142 will be secured within this opening. A portion of the arm stem 142, will extend into this opening, and the stem can be adhesively secured to the front arm section 124. Alternatively an interference fit or a snap latch can be employed. If the opening is threaded and the stem also includes a thread, then the arm stem 142 can be screwed into engagement with the front arm section 124. Although the arm stem 142 can completely fill the opening, a portion of the arm stem 142 will extend beyond the front arm section 124, so that the ball 140 will be sufficiently spaced so that it can fit within the socket 138. A portion of the arm stem 142 will also be exposed so that the arm stem can fit within notches 134 and 134 when the temple arm 120 is rotated in either of two directions.

The ball 140 and the ball stem 142 will preferably be part of a one piece component. This one-piece component can be machined from a metal blank. Alternatively the ball 140 and stem 142 can be injection molded as a one-piece plastic part. The ball 140 and the stem 142 can, however, be fabricated as separate parts and subsequently affixed to each other. For instance, an interior thread can be formed on the interior of the ball 140 and the ball stem 142 can be screwed into engagement therewith.

Once the ball 140 is aligned between the interior semi-spherical surfaces forming the spherical socket 138, the two socket components 131 and 132 can be secured by fasteners 139. The ball 140 may be fabricated so that it can be slightly larger than the socket 138, so that tension on the ball can be adjusted by the fasteners 139 so that a good fit can be formed between the ball 140 and the socket 138. The fit between the arms 120 and the frame 114 will not be loose. If screws are used for fasteners 139 a proper fit can be assured both during initial fabrication of the eyeglasses 110 or during subsequent adjustment.

The socket components 131 and 132 can be assembled to the ball 140 either before or after the components forming the ball and socket joint 130 are joined to either the frame 114 or the temple arm 120. The ball and socket joint 130 can be completely assembled before the ball stem 132 is attached to the temple arm 120. Alternatively the ball and socket joint 130 can be first assembled to the temple arm 120 after which the socket formed by socket components 131 and 132 are attached to the arm frame 114. Another assembly technique would employ initial attachment of socket component 131 to the frame 114 and initial attachment of the ball 140 to the temple arm 120. The temple arm 120 can then be assembled to the frame 114 by aligning the ball 140 between the two socket components and then attaching the outer socket component 131 to the inner socket component 131 to trap the ball 140 and to secure the temple arm 120 to the frame 114.

The socket 130 also includes two notches 134 and 136, which are each wide enough so that the stem 142 can fit into either notch. This will permit the temple arm 120 to be rotated in two perpendicular directions relative to the eyeglass frame 114. When the temple arm is rotated from the normal vision position shown in FIG. 10 to the storage position shown in FIG. 11, the stem 142 will be received within notch 134. When the temple arm 120 is rotated to the hanging position shown in FIG. 12, the ball stem 142 will fit within the other notch 136, which is formed between the two mating socket components 131 and 132. The notches 134 and 136 will restrict lateral movement of the arm stem 142 to hold the temple arms 120 in the storage and hanging positions.

The inner socket component 131 includes a cylindrical surface 133 facing toward the center of the eyeglass assembly 110. This cylindrical surface 133 can function as a guide when the temple arm 120 is rotated to the storage position shown in FIG. 11. If the socket component 131 is fabricated from a metal, then a magnet 152 can be attached to the temple arm 120. This magnet 152 will slide along this cylindrical surface 133 as the temple arm 120 is rotated to the storage position. The ball stem 142 will fit within notch 134 during this rotation, and the magnet 152 will support the arm 120 relative to the frame 112 so that the temple arm 120 will not become dislodged. In alternative configurations, a magnetic insert can be attached to the socket component 131. Other retention mechanisms may also be substituted for the magnetic configuration depicted herein. For example, a simple plastic snap arrangement could be substituted.

The magnet 152 is mounted on the front of a rod 150 that extend though a channel in the front temple arm section 124 and is attached to the rear ear piece section 122 of the temple arm 120. When the temple arm 120 is moved to the hanging position shown in FIG. 12, the length of the temple arm can be adjusted so that the eyeglasses will hang comfortably around the wearer's neck. As shown in FIG. 12, the magnet 152 can be disengaged from the metallic surface on the socket component 131, to allow the length of the temple arm 120 to be lengthened. The maximum extension occurs when the magnet 152, which is larger than the rod 150 abuts an opposed surface on the front arm section 124. In the preferred embodiment, the two arm sections 124 and 122 can slide relative to each other by a distance of one to one and one an one half inches (1 to 1 and ½ inches).

The first step in rotating the temple arm 120 from the normal vision position shown in FIG. 9 to the hanging position shown in FIG. 12 will normally be to rotate or twist the temple arm about its own axis relate to the frame 112. This twisting movement will not only disengage the magnet 152 from the cylindrical surface 133, but it will keep the ball stem 12 in alignment with the notch 136. Alternately, the temple arm can first be rotated upward, disengaging the magnet 150, but it will be necessary at some point to twist the temple arm 120 about its own axis in order to realign the curved ear piece 122 so that the ends of ear piece 122 will face inwardly as shown in FIG. 12. With the curved earpieces 122 facing inwardly in this manner, the curved ear pieces 122 will fit behind the wearer's neck so that the eyeglasses can be retained about his or her neck when not in use. Twisting the temple arm 120 in this manner will also place the temple arm 120 flat against the frame 112 so that the frame 112 and the lens will reside flat against the wearer's chest just below the wearer's neck. This will be a more comfortable position because any force exerted against the eyeglasses 110 and the wearer's chest will have less tendency to damage the eyeglasses 110 or to result in bruising or other injury to the wearer's chest. It should be understood that the ear piece 122 can be angled rather than being curved, so long as the rear end of the ear piece 122 of both temple arms 120 on opposite ends of the frame 112 will extend inwardly towards each other so as to fit behind the wearer's neck in the hanging position.

As shown in FIG. 12, a second rod 154 extends between the front arm section 124 and the rear ear piece section 122. This second rod 154 is attached to the front arm section 124 and extends into a companion opening in the ear piece section 122. This second rod 154 is not attached to the second rod 154, but it does prevent the two sections 122 and 124 of the temple arm 120 from rotating relative to each other. An alternative approach would be to employ a rod 150 having a noncircular cross section so that it cannot twist relative to the front arm section 124. The magnet 152 instead of the rod 154 will act as a stop.

Figure 15A:
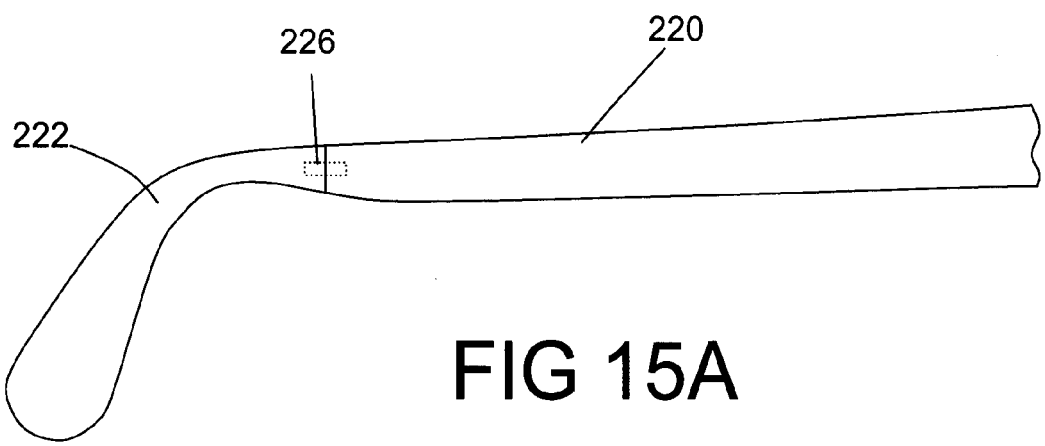
FIGS. 15A and 15B are views of an alternate configuration in which the ear pieces can be twisted to position the ear pieces behind the wearer's neck in the hanging position.
Figure 15B:
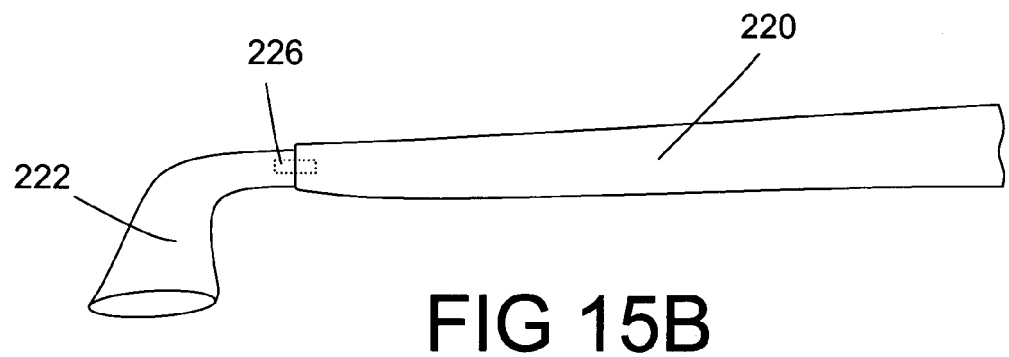

FIGS. 15A and 15B show a further modification in which the temple arms 220 of eyeglasses can include an end section or ear gripping section 222 hinged relative to the forward portion of the temple arms 220. The ear gripping sections 222 can be rotated inwardly about the hinge pin 226 from the normal viewing position shown in FIG. 15A to the hanging position shown in FIG. 15B. This will provide further means for orienting the ear gripping pieces behind the wearer's neck.

Each of these representative embodiments show a version of a pair of eyeglasses that can be rotated from a viewing position to a hanging position and also to a normal storage position. Numerous other embodiments according to this invention as defined by the following claims would be apparent to those of ordinary skill in the art.

The invention claimed is:

1. Eyeglasses comprising a front lens frame and a pair of temple arms and hinges between the front lens frame and each temple arm so that the temple arms can be folded about the hinges from a normal viewing position into a storage position with the temple arms folded behind the front lens frame, the eyeglasses also being characterized in that the temple arms can be folded about the hinges from a normal viewing position relative to the front lens frame into a hanging position in which the temple arms extend transversely relative to a position occupied by the temple arms in the storage position with ear gripping sections of the temple arms extending inwardly toward each other when in the hanging position so that the ear gripping sections can extend behind a wearer's neck to hold the eyeglasses around the wearer's neck.

2. The eyeglasses of claim 1 in which the temple arms can be hinged relative to the front lens frame so that the front lens frame lies substantially flat on a wearer's chest when in the hanging position.

3. The eyeglasses of claim 1 in which the position of rearwardly extending temple arms in a normal viewing position is perpendicular to the position of the temple arms in the hanging position.

4. The eyeglasses of claim 3 in which the temple arms in a storage position would be perpendicular to the position of rearwardly extending temple arms in a normal viewing position and to the position of the temple arms in the hanging position.

5. The eyeglasses of claim 1 wherein the temple arms are hinged relative to the front lens frames by ball and socket joints.

6. The eyeglasses of claim 5 wherein each ball and socket joint includes a socket having at least two notches providing clearance for rotation of a corresponding ball.

7. The eyeglasses of claim 6 wherein each ball includes a ball stem, the ball stems being received within notches on the corresponding sockets when the temple arms are rotated into either the storage position or the hanging position.

8. The eyeglasses of claim 7 wherein the balls are attached to corresponding temple arms by ball stems and the sockets are mounted on opposite ends of the front lens frame.

9. The eyeglasses of claim 5 including a support located below each ball and socket joint, the support comprising a first support member on the temple arm and a second support member on the front lens frame, the first and second support members being engagable when the temple arms are positioned relative to the front lens frame so that the eyeglasses may be worn in a viewing position.

10. The eyeglasses of claim 9 wherein the first support member includes a magnetic member and the second support member includes a member to which the magnetic member is attracted.

11. The eyeglasses of claim 1 wherein the temple arms are hinged to the front lens frame by multiple hinges at the juncture of each temple arm and the front lens frame, wherein first hinges are attached at opposite ends of the front lens frame, and a second hinge is attached to a front end of each temple arm, corresponding first and second hinges are attached to intermediate third hinges.

12. The eyeglasses of claim 11 wherein axes of the first and second hinges are parallel in a viewing position and are mutually transverse in the hanging position.

13. The eyeglasses of claim 11 wherein the third hinges comprise two discs rotatable relative to each other about a disc axis extending transverse to axes of the first and second hinges in the viewing, storage and hanging positions.

14. Eyeglasses comprising a front lens frame and a pair of temple arms hinged relative to the front lens frame about ball and socket joints at each end of the front lens frame so that the temple arms are foldable about the ball and socket joints from a normal viewing position into a storage position with the temple arms folded behind the front lens frame and are foldable about the ball and socket joints from a normal viewing position into a hanging position in which ear gripping sections extend toward each other behind a wearer's neck to hold the eyeglasses around the wearer's neck.

15. The eyeglasses of claim 14 wherein each ball and socket includes a socket having a plurality of notches and the corresponding balls include ball stems, the ball stems being received in the notches when the temple arms are rotatable into storage and hanging positions.

16. The eyeglasses of claim 15 wherein the temple arms are extendable so that the temple arms can be longer in the hanging position than in a normal viewing position.

17. The eyeglasses of claim 16 wherein the temple arms comprise a front section and a rear ear gripping section with a rod extending from the rear gripping section through the front section, the rod engaging the ball and socket joint in the normal viewing position.

18. Eyeglasses including a pair of temple arms each connected to a lens frame by a ball and socket joint, each ball and socket joint including a socket attached to the lens frame and a ball attached to a corresponding temple arm by a ball stem, each socket including first and second mutually perpendicular notches providing clearance for the corresponding ball stem when the temple arms are folded about mutually perpendicular axes so that the temple arms can be folded into a storage position or into a hanging position.

19. The eyeglasses of claim 18 wherein the socket is formed by two matable members, each having a semi-spherical surface on the inside thereof, so that when the two members are mated, a spherical socket is formed.

20. The eyeglasses of claim 19 wherein one of the notches is formed between the two mating members.

\* \* \* \* \*